Figure 1:
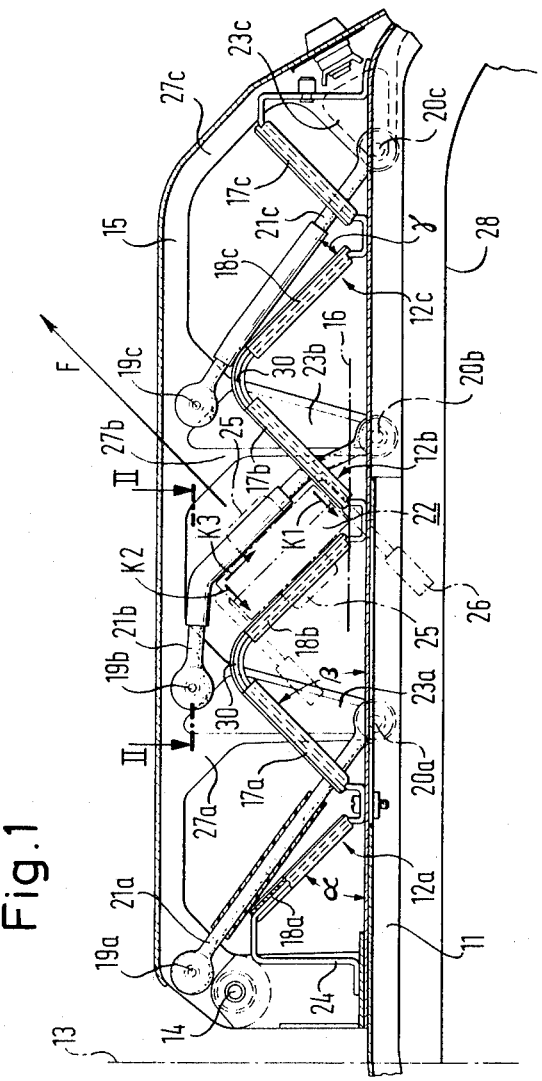

United States Patent [19]

Biermann et al.

[11] 4,226,351
[45] Oct. 7, 1980

[54] SKI HOLDING APPARATUS

[75] Inventors: Peter Biermann, Leonberg; Manfred Schmidt, Sindelfingen, both of Fed. Rep. of Germany

[73] Assignee: Vereinigte Baubeschlagfabriken Gretsch & Co. GmbH, Leonberg, Fed. Rep. of Germany

[21] Appl. No.: 53,383

[22] Filed: Jun. 29, 1978

[30] Foreign Application Priority Data

Jul. 12, 1978 [DE] Fed. Rep. of Germany ........ 2830676

[51] Int. Cl.³ .............................. B60R 9/04; B60R 9/08
[52] U.S. Cl. ................................. 224/325; 211/60 SK; 224/323; 224/324
[58] Field of Search ............... 224/325, 315, 319, 323, 224/324, 917; 211/60 SK, 60 R, 64, 4 R, 7; 248/316 R, 225.3; 294/87 R, 87.27, 87.26, 63 B, 67 A, 67 BC

[56] References Cited

U.S. PATENT DOCUMENTS

| 2,782,973 | 2/1957 | Lang | 224/323 |
| 2,988,253 | 6/1961 | Menghi | 224/324 X |
| 3,325,069 | 6/1967 | Fulton | 224/315 |
| 3,710,998 | 1/1973 | Marker | 224/315 X |
| 3,756,420 | 9/1973 | Brown | 211/60 SK |
| 3,836,058 | 9/1974 | Penniman | 224/315 |
| 3,897,895 | 8/1975 | Read | 224/323 |

Primary Examiner—Steven M. Pollard

[57] ABSTRACT

Ski holding apparatus is disclosed which comprises a rack for supporting a plurality of skis in a substantially common plane. The rack features pairs of holders arranged across the rack with the holders of each pair spaced apart along the rack so as to support at least one ski, or preferably a pair of skis at two spaced apart locations.

The holders are adapted to support the skis in inclined positions in which the mean transverse plane of the skis is arranged at angle of 30° to 60° to said common plane.

In this way the skis on the rack require less space. The rack can either be used on vehicle roofs, in ski rooms, or in storage spaces within vehicles. Each holder is conveniently closed by a closure member to retain the skis.

Various types of closure are described in which the individual closures for each holder may be either resilient or rigid and may also be supported from a common clamping arm.

47 Claims, 9 Drawing Figures

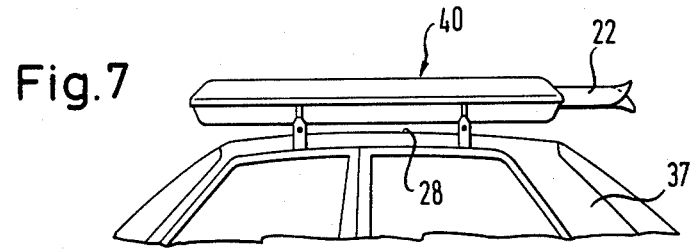
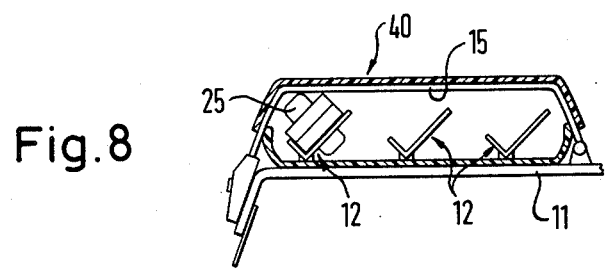
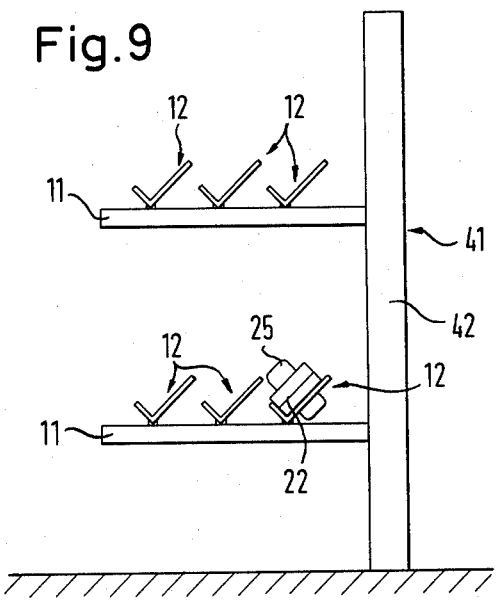

SKI HOLDING APPARATUS

The present invention relates to a ski holding apparatus and has particular reference to an arrangement with two spaced apart ski holders which are fastened, or fastenable, to a support structure and are adapted to receive at least one ski or in particular a pair of skis with their soles contacting each other.

Ski holding apparatus of this kind, often referred to as racks are generally provided with a plurality of pairs of holders so as to be able to accommodate several skis and are used in ski rooms and also extensively for fixing skis to vehicles in particular to private motor cars.

Various kinds of ski roof racks for motor cars are known. In one system the pairs of skis are arranged in holders with their narrow side edges uppermost and lying in a generally horizontal plane. This system has the disadvantage that the sideways spacing of the individual holders must be relatively large in order that the ski bindings and the ski brakes of neighbouring skis do not interfere with one another. In another system the pairs of skis are arranged with their soles lying in the horizontal plane and this arrangement means that the danger exists that the downwardly disposed ski bindings (particularly if the bindings are open), or the ski brakes can contact the roof of the car. The ski holders must, therefore, be arranged at a relatively large distance from the roof of the car but this is, however, undesirable because of stability and aerodynamic considerations. Both known kinds of ski holders or racks have the disadvantage that they take up considerable space and this is disadvantageous for the storage of skis in ski rooms or in closed vehicle spaces.

The principal object of the present invention thus resides in providing a ski holding apparatus particularly for vehicles and especially for private motor cars of the kind named above by means of which individual skis and particularly pairs of skis can be arranged relatively close to one another without the danger of interference between neighbouring ski bindings or ski brakes and without the ski bindings or ski brakes occupying an unnecessary amount of vertical space. At the same time the skis or pairs of skis should be safely secured via the ski rack.

For achieving this object the invention envisages the provision of ski holding apparatus comprising at least one pair of spaced apart holders for supporting a plurality of skis substantially parallel to one another in a substantially common plane, there being a plurality of pairs of holders arranged across the rack with the holders of each pair being spaced apart along the rack and being adapted to support at least one ski of a pair of skis at two locations the holders being further adapted to support the skis in inclined positions with the mean transverse plane of the skis arranged at an angle within the range 30° to 60° to said common plane.

The basic thought underlying the invention is thus to be seen in the concept of supporting the skis neither with their narrow edges uppermost nor with their soles parallel to the horizontal plane but rather in an inclined position in the holders so that both the lowermost top ski surface and the lowermost narrow edges of a pair of skis are simultaneously supported.

On account of the special choice of angle the bindings or ski brakes of neighbouring pairs of skis can no longer interfere but rather overlap each other by partially lying one above the other. The inclined position of the ski pairs means that the bindings, and ski brakes if fitted, at most project by a trivial amount below or above the holders so that contact of these parts on upper or lower parts e.g. such as the roof of a motor car need no longer be feared.

The arrangement of holders in accordance with the present invention makes is possible to arrange neighbouring ski pairs very closely packed alongside one another. The inclined arrangement of the ski pairs also has the advantage that the outwardly extending Vee shaped recess defined by each holder generally extends in a direction in which the hands of the skier must in any case move during insertion or removal of the pairs of skis, that i.e. when the ski holding apparatus is intended to allow introduction and removal of the pairs of skis from the side. Thus a very straightforward insertion or removal of the pairs of skis is possible. It should be emphasized that a trivial inclination of the pairs of skis due to a corresponding construction of the holders, as could e.g. be made on stylistic grounds is not sufficient in order to make possible the close, side by side arrangement of the ski pairs without taking up an undue amount of vertical space. In order to achieve this the angular ranges taught by the present invention are necessary and in particular the angle of 45° and the range of ±5° on either side of this preferred angle are the most favourable.

It is especially useful if each of the holders of each pair of holders is arranged on a respective carrier member and if the carrier members are spaced apart by the desired spacing for the holders of each pair. At least two and preferably from three to six holders are arranged side by side on each carrier member.

When using the ski holding apparatus of the present invention on a vehicle and in particular on a privat motor car or also possibly inside a vehicle the weight of the ski pairs is generally insufficient in order to secure them in the holders. The invention thus envisages a preferred embodiment in which a closure is associated with each holder the closure being movable between a closed position in which it secures the skis in the holder and an open position in which the skis can be removed from the holder.

A first possibility for the practical realization of the closure is that the closure associated with each holder is made individually movable. In particular, in this case the closure can be a resilient strap or resilient cord which is tensionable over the holder i.e. over the Vee shaped recess therein. The strap, or cord, should be fixed to one end of one of the limbs defining the Vee shaped recess and should be releasably connectable to the end of the other limb defining the Vee shaped recess.

The particular advantage offered by this embodiment is that after releasing the elastomeric band or the elastomeric loop the simple holder defined by the two limbs of the Vee shaped recess is completely open at its upper side so that the introduction and removal of the skis can take place without the need for particular care or attention as a pair of skis only contacts the recess by one top surface and by two adjacent narrow edges.

In accordance with a further embodiment the closure can be a clamp of rigid or resilient material movable away from the holder and spring biased relative thereto. By moving the clamp away from the holder the necessary opening can be provided for the introduction of the pair of skis which are then secured automatically via the spring bias operating on the clamp.

It is especially advantageous if the closure is fixed to the end of the holder remote from the side from which the skis are introduced and includes solely an angled portion which extends over the Vee shaped recess. In this arrangement the closure is preferably pivotable away from the recess or can alternatively by resiliently deflected so as to provide the necessary access to the recess. It is expecially advantageous if the extreme uppermost corner of the angled portion is provided with a chamfer. In this manner the closure does not need to be especially pressed away to allow the introduction of the pair of skis but rather the simple act of pressing on the closure with the pair of skis is sufficient to automatically deflect it to the side so that it then snaps back into the clamped position once the pair of skis has been fully inserted into the holder.

A further practical possibility is to construct the closure to have a first arm which is fixedly arranged parallel to one side of the Vee shaped recess and a further arm which can be pushed or pivoted away from the recess to permit access thereto. In this way the holder has a generally U shaped form which can be closed by a pivotably or slidably displaceable arm.

It is, however, especially advantageous if the closures associated with a number of the holders are arranged on at least one clamping arm which can be removed from or arranged above the holders and is securable in a closed position in which the individual holders are all closed by their associated closures. If the ski holding apparatus is arranged on a car roof then the clamping arm is usefully made vertically pivotable upwardly about a longitudinal axis. In accordance with a further advantageous modification one or two pairs clamping arms are symmetrically arranged about the central longitudinal axis of the ski rack with their pivot axes in the vicinity of this central longitudinal axis, in this arrangement each clamping arm can advantageously be associated with three holders arranged alongside each other so that in total place is available for six pairs of skis.

The arrangement of the closures on clamping arms means that the operation of individually securing each pair of skis in its holder can be spared.

The practical realization of an arrangement in which a plurality of closures are arranged on one clamping arm can be achieved, in accordance with a third embodiment, by providing, for each holder, an elastic tension element which extends between two points on the clamping arm through the space which, in the engaged position of the arm is occupied by a pair of skis supported by the associated holder and which forms the single part of the clamping arm which comes into engagement with the pair of skis (or ski) that is engaged within the holder.

The arrangement of this embodiment is such that the elastic tension element exerts a downward force essentially diagonally through a pair of skis thus pressing the pair of skis into the Vee shaped recess defined by the holder and thus safely securing the skis against all the vibrations or aerodynamic forces that may occur.

Usefully bracing arms extend at intervals from the clamping arm to the carrier member in order to form one of the fixture points for the resilient tensile element whilst lugs or bolts are preferably provided at the same spacing on the clamp arm to form the other fixture points for the resilient tensile element.

The arrangement of the resilient tensile element, which is preferably formed as a rubber cord is of special significance for the present invention. The resilient tensile element preferably extends by an amount of from 30 to 50% and particularly 40% of the width of the recess for accommodating a pair of skis (the width of the pair of skis), beyond both ends of the recess. In the section transverse to the longitudinal axis the tensile element should preferably make an angle of between 0 and 30° and especially 15° with the support limb of the Vee shaped recess on which the top surface of the ski is intended to rest. Furthermore, it is useful if, in the section transverse to the longitudinal axis, the tensile element, at its point of intersection with the limb of the Vee shaped recess for supporting the narrow sides of the pair of skis, has its largest spacing from the other limb of the recess. This spacing should in particular be from 40 to 60% of the average cross-sectional thickness of a pair of skis.

In the section transverse to the longitudinal axis the tensile element should approximately be tangential to the end of the limb of the Vee shaped recess supporting the top surface of the ski which is remote from the limb of the Vee shaped recess which supports the narrow edges of the pair of skis.

The construction in accordance with the invention ensures that the resilient tensile element, when tensioned over a pair of skis runs first of all approximately horizontally from the upper fixture point towards the pair of skis, then turns downwardly in order to extend along the top surface of the pair of skis and finally makes a further turn downwardly beneath the pair of skis towards the lower fixture point. This last part of the elastomeric tension element thus extends substantially vertically and the last turn in the tension element generates a force component towards the limb of the Vee shaped recess which supports the lower ski of the pair of skis.

Although the limbs of the Vee shaped recess can be formed by pieces of a round or flat material arranged on the carrier member it is preferred if the limbs are formed by a piece of sheet metal bent in zigzag like form which is fastened to the carrier member. Preferably the limb of the Vee shaped recess intended to support the narrow side edges of the pair of skis, (which for this purpose only need to be made relatively short) is extended upwardly by an amount such that it continuously adjoins the neighbouring limb of the adjacent Vee shaped recess which is intended to support the top surface of the lower ski of a pair of skis. In this manner a slide surface is available for the insertion and removal of a pair of skis which significantly simplifies these operations.

It is especially advantageous if, as seen in the transverse direction resilient tensile elements are provided on both sides of the Vee shaped recess.

In order to avoid the loss of a pair of skis should the tension of the resilient tensile elements slacken, or should a resilient tensile element break, projections are usefully formed on the clamp arms which project inwardly to about the height of the binding and which limit the possible displacement of a pair of skis in the forward or rearward direction by providing an abutment for the parts of the bindings which project above the top surfaces of the skis.

Figure 2:
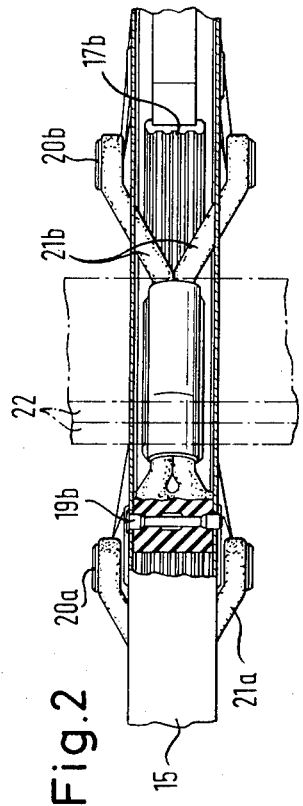
Figure 3:
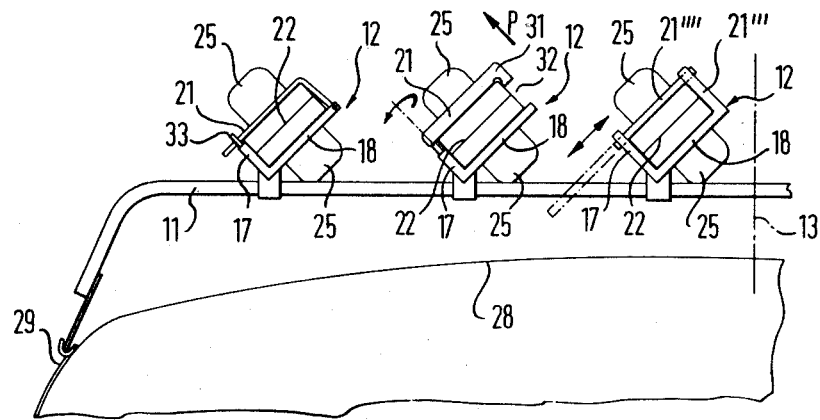
Figure 4:
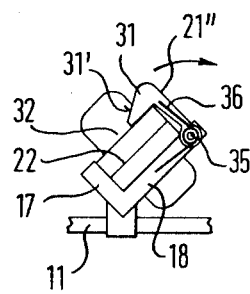
Figure 5:
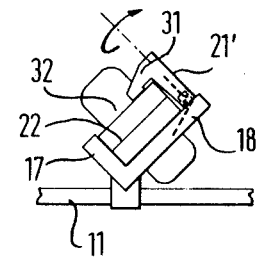
Figure 6:
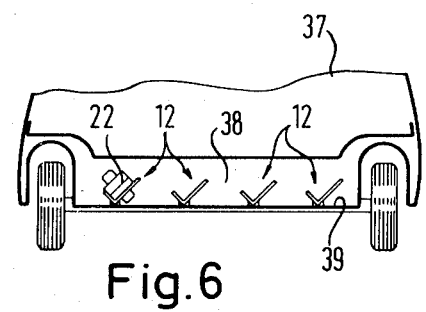

The invention will now be described in greater detail by way of example only with reference to the accompanying drawings which show:

FIG. 1 a schematic front view of one half of a ski roof rack for a motor car,

FIG. 2 a partial sectional plan view taken on the line II—II of FIG. 1, however, to a larger scale, FIG. 3 a similar view to that of FIG. 1 of an embodiment in which an independently operable closure is associated with each ski holder and in which three different possibilities for the practical form of the closure are illustrated alongside each other, FIG. 4 a further advantageous possibility for the arrangement of a closure on a ski holder, FIG. 5 a modification of the subject of FIG. 4, FIG. 6 a schematic partial section of a vehicle with a ski space arranged at the base of the vehicle and in which a ski holding apparatus in accordance with the present teaching is housed, FIG. 7 a schematic side view of a private motor car with a box for receiving skis provided on its roof, FIG. 8 a cross-section of the ski box of FIG. 7 which likewise includes the ski holding apparatus of the present invention and FIG. 9 a schematic section through a rack suitable for use in a ski room which is provided with ski holding apparatus in accordance with the present teaching.

Turning first of all to FIGS. 1 and 2 there can be seen the essential details of a ski roof rack in accordance with the present teaching which is suitable for use on a private motor car. For the purposes of simplicity only the side of the ski rack to the right of the central longitudinal plane 13 is shown and it will be understood that the other side of the ski rack will be a symmetrical mirror image of the arrangement shown in FIGS. 1 and 2. Furthermore, in conventional fashion the ski rack is based on two carrier members 11 (of which only the front carrier member is shown in FIG. 1) which are connected to the rain channels at either side of the car roof (these rain channels 29 can e.g. be seen in FIG. 3).

In the arrangement of FIG. 1 a small clearance is present between the roof 28 of the motor car and the lower side of the carrier member 11. Three holers 12a, 12b, 12c are fastened to the upper side of the carrier member 11 and are spaced sideways from each other. Corresponding ski holders (not shown) are also provided on the rearmost carrier member 11 and thus each of the holders 12a, 12b, 12c forms one of a pair of holders. Each holder comprises first and second support surfaces 17a, 18a; 17b, 18b; 17c, 18c; which are respectively arranged substantially at right angles to one another and which define generally Vee shaped recesses. The holders 12 are conveniently formed from a single bent piece of sheet metal 21 which is advantageous from the point of view of manufacture and results in the individual limbs 17, 18 of the individual holders being connected together by bridges 30. Whilst the angle between the limbs 17 and 18 of each holder amounts to 90° the angles α and β which these limbs respectively subtend to the carrier member 11, i.e. to the plane of the support structure, is conveniently 45°. The length of the limbs 17 and 18 must at least be sufficiently large that a pair of skis can be introduced into the holder in the manner shown in FIGS. 1 and 2 and can be securely held by the limbs. If the limb 17 receives the narrow edges of the pair of skis then it can be made shorter than the limb 18 which forms the support of the top surface of the lower ski of the pair of skis.

In order to safely secure the pair of skis 22 in the Vee shaped recess defined between the limbs 17 and 18 a clamping arm 15 is provided above the holders 12 and this clamping arm is pivotable about a longitudinal fore and after axis 14 in the vicinity of the centre of the ski rack. The clamping arm 15 extends in general parallel to the carrier member 11 and curves downwardly towards the carrier member 11 at its outside end so that it can e.g. be latched to the carrier member 11 by means of a lock. In this manner the pairs of skis can be secured against theft.

The clamping arm 15 has lugs 19a, 19b, 19c which are spaced apart sideways and rubber cords 21a, 21b and 21c extend downwardly on both sides of the clamping arm 15 to fixture points 20a, 20b and 20c which are provided on downwardly projecting and sideways spaced apart support arms 23a, 23b and 23c. The rubber cords thus define resilient tensile elements.

The fixture points 19 and 20 are so arranged that a partially pretensioned rubber cord 21 adopts the position shown in FIG. 1 at 21c prior to the insertion to a pair of skis.

If now a pair of skis is introduced in the illustrated manner into the support 12b whilst the clamping arm 15 is in its upwardly pivoted position then, on closing the clamping arm 15 by pivoting it downwardly to its closed position the rubber cord 21b is tensioned around the pair of skis 22 in the manner shown at 21b in FIG. 1 and presses the pair of skis against the support limbs 17 and 18. The forces exerted by the rubber cord 21b are shown by the arrows K1, K2 and K3. These forces must be sufficiently large in order to safely secure the skis against all the shaking, vibration and aerodynamic forces that the skis may experience. Apart from the rubber cords 21 no further part of the clamping arm 15 engages the pair of skis.

It can be clearly seen from FIG. 1 that the inclined arrangement of the invention means that the bindings 25 and the ski brakes 26 of the pair of skis 22 can no longer interfere with one another, with neighbouring pairs of skis, or with the car roof 28 although the ski holders 12 could be arranged more closely together than is shown in FIG. 1.

The invention thus provides not only a very safe ski holder but also a ski holder which is compact and economical of space for pairs of skis which abut one another by their running surfaces or soles.

It will be understood that a complete ski holding apparatus or rack based on the arrangement shown in FIG. 1 will feature six holders 12 arranged alongside each other on each of two carrier members 11 arranged one behind the other in the longitudinal direction on the roof of the motor car thus defining a common support plane 16 and that this ski rack can accommodate six pairs of skis.

When the clamping arms 15 are pivoted to an upward open position then the pairs of skis 22 can be removed in the direction F (FIG. 1) by an arm movement which comes naturally to the skier and the skis can likewise be comfortably reinserted by movement in the reverse direction.

FIG. 1 also shows a number of parts 27a, 27b and 27c which project from the clamp arm 15 into the vicinity of the recess for the skis to a sufficient extent that the skis are prevented from sliding in the longitudinal direction as the binding parts or ski brake parts which project from the top surfaces of the skis will contact the projecting parts 27. This arrangement also avoids with certainty the possibility that the skis can fall out of the ski holding apparatus should the closure parts 21 rupture or lose their tension. The corner regions 27 thus represent an additional means of securing the pair of skis in the ski holding apparatus.

FIG. 3 shows various simplified embodiments in which the clamp arm 15 of the embodiment of FIG. 1 is no longer used and individual closures 21 are instead provided for each of the holders 12.

In the embodiment shown at the extreme left of FIG. 3 a rubber strap, rubber cord, or rubber loop 21 is fastened to the end of the limb 18 which supports the top surface of the ski. The rubber band 21 can then be tensioned in the manner shown in FIG. 3 around the pair of skis 22 and can be releasably fastened to the end of the narrow limb 17 of the holder which is remote from the apex of the generally Vee shaped recess. The releasable fastening can e.g. be achieved by means of an opening in the rubber strap which is applied over a hook 33.

In the embodiment shown in the centre of FIG. 3 the closure 21 which extends over the top surface of the top ski of the pair of skis is formed of resilient material. It can thus be pressed away from the skis in the direction of the arrow P and rotated about an axis such that the pair of skis can then be removed through the access opening 32. The angled portion 31 ensures a safe retention of the pair of skis 22 in the holder 12.

Finally in the third embodiment shown at the right hand side of FIG. 3 the closure which secures the pair of skis 22 comprises a rigidly formed part 21''' which is arranged parallel to the limb 17 and a displaceable part 21'''' which is disposed parallel to the other limb 18 and is displaceable from the inclined closed position shown in full lines to the open position shown in broken lines. In corresponding manner the part 21'''' can also be pivotably arranged, it can e.g. be made upwardly pivotable. It is, however, especially advantageous if, as shown in FIGS. 4 and 5 the access openings 32 for the ski holding apparatus are directed towards that side of the ski from which the introduction, or removal of the pair of skis 22 takes place. For this purpose a rigid closure 21'' (FIG. 4) is arranged to be pivotable in a sideways direction about the longitudinal axis 35 against the force of a hair pin spring 36. Alternatively, as seen in FIG. 5 a resilient closure 21' which extends parallel to the shorter 17 of the two limbs 17 and is attached to the end of the longer limb 18 remote from the apex of the Vee shaped recess is arranged to be pivoted sideways as shown by the arrow.

An angled portion 31 of the closure 21 extends sufficiently far over the access opening 32 that after the angled portion 31 has snapped into position on the top surface of the top ski of the pair of skis 22 the skis are safely retained. Advantageously the angle portion 31 is provided with a chamfer 31' at its upper topmost corner as shown in FIG. 4 and the inclination of this chamfer is chosen so that on pressing the pair of skis 22 against the closure 21'' the closure will automatically be pushed away to the side and will free the access opening 32. After the skis have been introduced the closure 21'' snaps back into position of its own accord so that the pair of skis 22 is safely retained from all four sides.

Turning now to FIG. 6 there is shown a schematic cross-section through a vehicle 37 which is provided with a ski reception space or chamber 38 which extends along the length of the vehicle and is arranged adjacent the floor thereof. Four ski holders 12 are arranged alongside one another on the lower edge 39 of the ski reception chamber 38 and it will be understood that each of these ski holders forms one of a pair of ski holders axially spaced apart in the longitudinal direction of the vehicle. The arrangement shown in FIG. 6 is thus capable of accommodating four pairs of skis.

In FIG. 7 there can be seen a side view of the upper part of a vehicle 37 which has a ski box 40 fastened to its roof 28. The section of this box illustrated in FIG. 8 shows that the ski holding apparatus of the present teaching can also be arranged inside a ski box of this kind and in particular that the cover of the ski box 40 can form the clamping arm 15.

FIG. 9 shows a rack 41 with two vertically arranged supports 42 which are provided with carrier members 11 to each of which there are respectively fastened three ski holders 12. Two vertical supports and associated carrier members 11 and holders 12 are arranged spaced apart as seen in the longitudinal direction of the ski by a distance such that the bindings of the skis are located between the two parts of the rack.

Closures for retaining the pairs of skis in the holders are not necessary for this simplified use of the invention in a rack for a ski room.

A special feature of the embodiment shown in FIGS. 1 and 2 are the synthetic of plastic tubes which clamp together the pairs of rubber cords which are fastened to each side of the clamp arm 15. In this way the possibility of collision with the limbs 17 is avoided and simultaneously a uniform abutment on the pair of skis is ensured. In particular, forces extending in an inclined direction at the junction of the two cords which could otherwise have led to failure are avoided. The synthetic tube is located at the region where the cords cross the edge of the ski and thus prevents too pronounced a load in the cords at this point.

The support surfaces of the limbs 17 and 18 can also be partially interrupted. If the pairs of skis are already held together by clips or ski brakes then an abutment is only required at a few points. Indeed, a ski does not need to be supported at all by the narrow side edges thereof.

As used in this specification and claims the term "top surface" of a ski is used to distinguish the sole or running surface and the upper surface to which the bindings are attached from the narrow side edges.

If a rack is adapted to carry skis in pairs then the term "top surface" is only applicable to the aforementioned upper surface. If however the rack is adapted to carry skis singly the term "top surface" will be understood to mean both the upper surface and, as an alternative, the sole of the ski.

It will be appreciated by those skilled in the art that modifications be made to the ski holding apparatus herein described without departing from the scope of the present teaching as defined by the appended claims.

We claim:

1. Ski holding apparatus comprising a rack for supporting a plurality of skis substantially parallel to one another in a substantially common plane, there being a plurality of pairs of holders arranged across the rack with the holders of each pair being spaced apart along the rack and being adapted to support at least one ski of a pair of skis at two locations the holders being further adapted to support the skis in an inclined positions with the mean transverse plane of the skis arranged at an angle within the range 30° to 60° to said common plane.

2. Ski holding apparatus according to claim 1 and in which each said pair of holders is adapted to support a pair of skis arranged with their soles facing each other.

3. Ski holding apparatus according to claim 1 and in which each said holder has first and second support surfaces disposed substantially at right angles to each other defining a Vee shaped recess for receiving a ski in said inclined position.

4. Ski holding apparatus according to claim 3 and in which the first support surfaces of the holders are adapted to support the narrow side edges of skis and the second support surfaces are adapted to support the top surfaces of skis.

5. Ski holding apparatus according to claim 1 and further comprising first and second carrier members arranged spaced apart along the rack by a distance substantially equal to the spacing between the holders of each pair of holders the holders of each pair of holders being arranged one on each carrier member.

6. Ski holding apparatus according to claim 5 and in which from two to six pairs of holders are arranged alongside each other.

7. Ski holding apparatus according to claim 3 and in which a closure is associated with each holder the closures being movable between open positions permitting the insertion of skis and closed positions for securing the skis to the holders.

8. Ski holding apparatus according to claim 7 and in which the closure associated with each holder is individually movable.

9. Ski holding apparatus according to claim 8 and in which each closure is a resilient strap tensionable over its associated holder.

10. Ski holding apparatus according to claim 8 and in which each closure is an elastic cord tensionable over its associated closure.

11. Ski holding apparatus according to claim 9 and in which each said Vee shaped recess is defined by two limbs, each said resilient strap being connected to one end of one limb and being releasably connectable to the end of the other limb.

12. Ski holding apparatus according to claim 10 and in which each said Vee shaped recess is defined by two limbs, each said elastic cord being fixed to the end of one of the limbs and is releasably connectable to the end of the other limb.

13. Ski holding apparatus according to claim 8 and in which each said closure comprises a spring biased clamp of rigid material movable away from its associated holder to free the access opening thereto.

14. Ski holding apparatus according to claim 13 and in which each closure is arranged at the side of the holder remote from that from which the skis can be introduced into the access opening and that solely an angled portion of said closure extends over the access opening.

15. Ski holding apparatus according to claim 14 and in which each said closure is pivotable relative to its associated holder for freeing the access opening.

16. Ski holding apparatus according to claim 14 and in which each said closure is deflectable relate to its associated holder to free the access opening thereto.

17. Ski holding apparatus according to claim 16 and in which the closure has a chamfer at its top surface of the end of the angled portion above the access opening.

18. Ski holding apparatus according to claim 15 and in which said closure has a chamfer on the top surface of the end of the angled portion above the access opening.

19. Ski holding apparatus according to claim 8 and in which each said closure comprises a spring biased clamp of resilient material movable away from the holder against spring bias.

20. Ski holding apparatus according to claim 8 and in which the Vee shaped recess of each holder is defined between a pair of limbs and in which said closure comprises a first arm extending parallel to one of the limbs and a second arm mounted on the first arm and movable between a closed position in which it at least partially covers the access opening to said Vee shaped recess and an open position in which the access opening to the recess is freed.

21. Ski holding apparatus according to claim 7 and in which the closures associated with a plurality of holders are arranged on at least one clamp arm and are jointly movable on said clamp arm from said open to said closed positions and wherein the clamp arm can be locked with the closures in said closed positions.

22. Ski holding apparatus according to claim 21 and adapted for use as a ski roof rack for a motor vehicle and in which said clamping arm is upwardly pivotable about a longitudinal axis.

23. Ski holding apparatus according to claim 22 and in which two longitudinally spaced apart pairs of clamp arms are provided and adapted to pivot about pivot axes located near the centre of the rack.

24. Ski holding apparatus according to claim 23 and in which one said clamp arm is associated with three holders arranged side by side.

25. Ski holding apparatus according to claim 21 and in which said clamp arm is associated with a number of holders arranged side by side and in which each closure comprises a resilient tensile member extending between a pair of respective fixture points on said arm each pair of fixture points being disposed so that said resilient tensile member extends across the associated holder and forms the sole part of the clamping arm which contacts a ski engaged in the associated holder.

26. Ski holding apparatus according to claim 25 and in which a plurality of support arms extend downwardly at spaced intervals from the clamping arm and that a respective fixture point of each pair of fixture points is provided on each said support arm.

27. Ski holding apparatus according to claim 26 and in which the other said fixture point of each pair of fixture points is provided on said clamp arm.

28. Ski holding apparatus according to claim 27 and in which the fixture points on said clamping arm are defined by a series of spaced apart lugs.

29. Ski holding apparatus according to claim 25 and in which each said tensile element subtends an angle in the range 0° to 30° with the surface of said holder intended to support the top surface of ski engaged in the holder.

30. Ski holding apparatus according to claim 29 and in which said angle in the range 0° to 30° is 15°.

31. Ski holding apparatus according to claim 30 and in which each said tensile element has its largest spacing from the limb of the holder adapted to support the top surface of the ski at its point of intersection with the limb adapted to support the narrow side edge surface of a ski.

32. Ski holding apparatus according to claim 31 and in which said separation amounts to a distance lying within a range equivalent to 40 to 60% of the average thickness of a pair of skis.

33. Ski holding apparatus according to claim 25 and in which, as seen in a section transverse to the longitudinal axis of the rack each tensile element is approximately tangential to the end of the limb of the holder which is adapted in operation to support the top surface of a ski and which is remote from the apex of the Vee shaped recess in the holder.

34. Ski holding apparatus according to claim 25 and in which the support limbs of the holders are formed by the sides of a strip of metal bent into a zigzag like form and fastened to an associated carrier member.

35. Ski holding apparatus according to claim 25 and in which the limb of each holder that is adapted to support the narrow side edges of a pair of skis is extended to adjoin the limb of the neighbouring holder that is adapted to support the top surface of one ski of a pair of skis.

36. Ski holding apparatus according to claim 25 and in which the limb of each holder that is adapted to support the narrow side edges of a pair of skis is located to the outside of the limb that is adapted to support the top surface of the lower ski of the pair of skis.

37. Ski holding apparatus according to claim 25 and in which the resilient tensile element has a modulus of elasticity in the range 100 to 400 kp/cm$^2$.

38. Ski holding apparatus according to claim 37 and in which said modulus of elasticity is 200 kp/cm$^2$.

39. Ski holding apparatus according to claim 25 and in which said resilient tensile element is a rubber cord.

40. Ski holding apparatus according to claim 25 and in which, as seen in the transverse direction, resilient tensile elements are provided on both sides of each holder.

41. Ski holding apparatus according to claim 40 and in which each pair of tensile elements associated with each holder are joined together at least over a portion of their length by a sleeve.

42. Ski holding apparatus according to claim 21 and in which inwardly directed projections are provided on the clamping arm and are adapted for cooperation with the bindings of skis supported in the ski holding apparatus to prevent excessive movement thereof.

43. Ski holding apparatus according to claim 25 and in which each said tensile element is releasably arranged at the associated pair of fixture points.

44. Ski holding apparatus according to claim 1 and in which protective layers of material are provided on the limbs of the holders.

45. Ski holding apparatus according to claim 44 and in which said protective layers are in a synthetic material.

46. Ski holding apparatus according to claim 44 and in which said protective layers are of rubber.

47. A pair of ski holders adapted for use in a ski holding apparatus according to claim 1.